United States Patent
Schulmeister

[19]

[11] Patent Number: 6,148,790
[45] Date of Patent: *Nov. 21, 2000

[54] METHOD FOR OPERATING AN INTERNAL COMBUSTION ENGINE, IN PARTICULAR IN A MOTOR VEHICLE

[75] Inventor: Ulrich Schulmeister, Korb, Germany

[73] Assignee: Robert Bosch GmbH, Stuttgart, Germany

[ * ] Notice: This patent is subject to a terminal disclaimer.

[21] Appl. No.: 09/112,501

[22] Filed: Jul. 9, 1998

[30] Foreign Application Priority Data

Jul. 10, 1997 [DE] Germany .............................. 197 29 580

[51] Int. Cl.[7] ...................................................... F02B 17/00

[52] U.S. Cl. ............................ 123/295; 123/300; 123/305

[58] Field of Search ..................................... 123/295, 299, 123/300, 305

[56] References Cited

FOREIGN PATENT DOCUMENTS

| 43 32 171 A1 | 3/1995 | Germany . |
|---|---|---|
| 196 12 150 A1 | 10/1997 | Germany . |
| 196 31 956 A1 | 2/1998 | Germany . |

*Primary Examiner*—John Kwon
*Attorney, Agent, or Firm*—Kenyon & Kenyon

[57] ABSTRACT

In a method of operating an internal combustion engine, in a motor vehicle in particular, fuel is injected directly into a combustion chamber of the engine either during an intake phase in a first mode of operation or during a compression phase in a second mode of operation. In this method, fuel is injected at intervals corresponding to predetermined angle of rotation distances of a shaft of the engine. The interval corresponds to larger angle of rotation distances at a high engine rpm and a high load applied to the combustion engine than at a medium or low engine rpm and a medium or low engine load.

9 Claims, 1 Drawing Sheet

METHOD FOR OPERATING AN INTERNAL COMBUSTION ENGINE, IN PARTICULAR IN A MOTOR VEHICLE

FIELD OF THE INVENTION

The present invention relates to a method for operating an internal combustion engine, and in particular in a motor vehicle, wherein fuel is injected directly into a combustion chamber of the engine either during an intake phase in a first operating mode or during a compression phase in a second operating mode, and wherein the fuel is injected in a grid of predetermined angle of rotation distances of a shaft of the internal combustion engine.

BACKGROUND INFORMATION

Systems of direct injection of fuel into the combustion chamber of an internal combustion engine are generally known. A distinction is made between homogeneous operation as the first mode and stratified operation as the second mode. Stratified operation is used in particular at low loads, while homogeneous operation is used when higher loads are applied to the engine. In stratified operation, fuel is injected into the combustion chamber during the compression phase of the combustion engine. As a result, there is no longer a uniform distribution of fuel in the combustion chamber. The advantage of stratified operation is that the applied smaller loads can be carried by the combustion engine with a very small amount of fuel. However, higher loads cannot be handled in stratified operation. In homogeneous operation, which is intended for such higher loads, fuel is injected during the intake phase of the engine, so that turbulence and therefore distribution of fuel in the combustion chamber are easily achieved. To this extent, the homogeneous mode corresponds approximately to the operation of combustion engines in which fuel is injected into the intake manifold in a conventional manner.

In both modes, i.e., in stratified operation and in homogeneous operation, the fuel injection time is calculated by a controller as a function of a plurality of input parameters so as to achieve an optimum value with regard to saving fuel, reducing exhaust and the like. The actual injection of the fuel then takes place at intervals determined by the predetermined angle of rotation distances. The angle of rotation distances are based on the crankshaft of the combustion engine in particular.

As a result, the actual fuel injection can take place only after the crankshaft has rotated by this angular distance, but not in between. For example, if the angle of rotation distance is six degrees, this means that the actual injection can always take place only every six degrees. Thus, the actual injection has an accuracy corresponding to the angle of rotation distance, i.e., an accuracy of six degrees, for example.

To achieve the above-described fuel savings in stratified operation, the calculated injection time must be maintained as accurately as possible. Thus, the accuracy of the actual injection must be as great as possible. This can be achieved by setting the angle of rotation distance corresponding to the intervals at which the actual injection can take place as small as possible. As a result, however, the controller must perform a greater number of computations because of the smaller angle of rotation distance, and thus the controller is under a greater load.

One of the objects of the present invention is to provide a method of operating an internal combustion engine with which the actual injection time can be maintained as accurately as possible.

SUMMARY OF THE INVENTION

This object is achieved by the fact that at a high engine rpm and with a high load applied to the engine, the interval corresponds to larger angle of rotation distances than at a low or moderate engine rpm and a low or moderate load applied to the engine. Thus, at a high rpm, a larger angle of rotation distance is defined than at a low or moderate rpm. At a high rpm, the controller would have less time available to perform calculations. However, this smaller amount of time is lengthened again by the greater angle of rotation distance and is thus compensated. Conversely, the controller would have more time available at the low rpm. However, this greater amount of time is compensated by the smaller angle of rotation distance.

Thus, according to the present invention, a reduction in engine rpm is utilized for a reduction in the angle of rotation distance. This is equivalent to an increase in accuracy of the actual injection at a low or moderate rpm. However, this is specifically the rpm at which stratified operation is especially advantageous. Thus, on the whole, the accuracy of the actual injection and thus the resulting fuel savings are greatly increased in stratified operation using the method according to the present invention.

In an advantageous embodiment of the method according to the present invention, the interval corresponds to larger angle of rotation distances at a medium rpm and medium load than at a low rpm and low load. Thus, the method according to the present invention which is applicable at high and medium or low rpm is now used at medium and low rpm. This means that the greater amount of time which would have been available to the controller due to a reduction in rpm from a medium to low rpm is used so that the angle of rotation distance is again reduced with the above-mentioned reduction. However, the reduction in angle of rotation distance at the same time represents an increase in accuracy of the actual injection, and thus represents a further improvement in the method according to the present invention with regard to fuel savings in stratified operation.

In another advantageous embodiment of the method according to the present invention, the angle of rotation distances at high rpm and high load are approximately twice as great as at medium rpm and medium load, and at medium rpm and medium load they are approximately three times as great as at low rpm and low load. In particular, the angle of rotation distances at high rpm amount to approximately six degrees, at medium rpm they amount to approximately three degrees, and at low rpm approximately one degree.

In yet another embodiment of the method according to the present invention, the engine is operated in the first mode at high rpm and high load, and in the second mode the engine is operated at medium or low rpm and medium or low load. As a result, precisely in stratified operation, where the time of the actual injection must match the calculated time especially accurately, it is necessary to preselect the smallest angle of rotation distances with which the greatest accuracy in the actual injection and thus the greatest fuel savings can be achieved.

It is further advantageous if, in the second mode of operation, the injected fuel is guided by the wall of the combustion chamber or by the charge movement in the combustion chamber. The method according to the present invention can be used especially well with this type of fuel injection.

The implementation of the method according to the present invention in the form of an electric storage medium which is provided for the engine controller of a motor vehicle in particular is also important. A program which is capable of running on a computer, specifically a microprocessor, and is suitable for carrying out the method according to the present invention is stored on the electric storage medium. Thus, in this case the present invention is implemented by a program stored on the electric storage medium, so that this storage medium provided with the program represents the present invention just as does the method which the program is suitable for executing.

DETAILED DESCRIPTION

Figure 1:
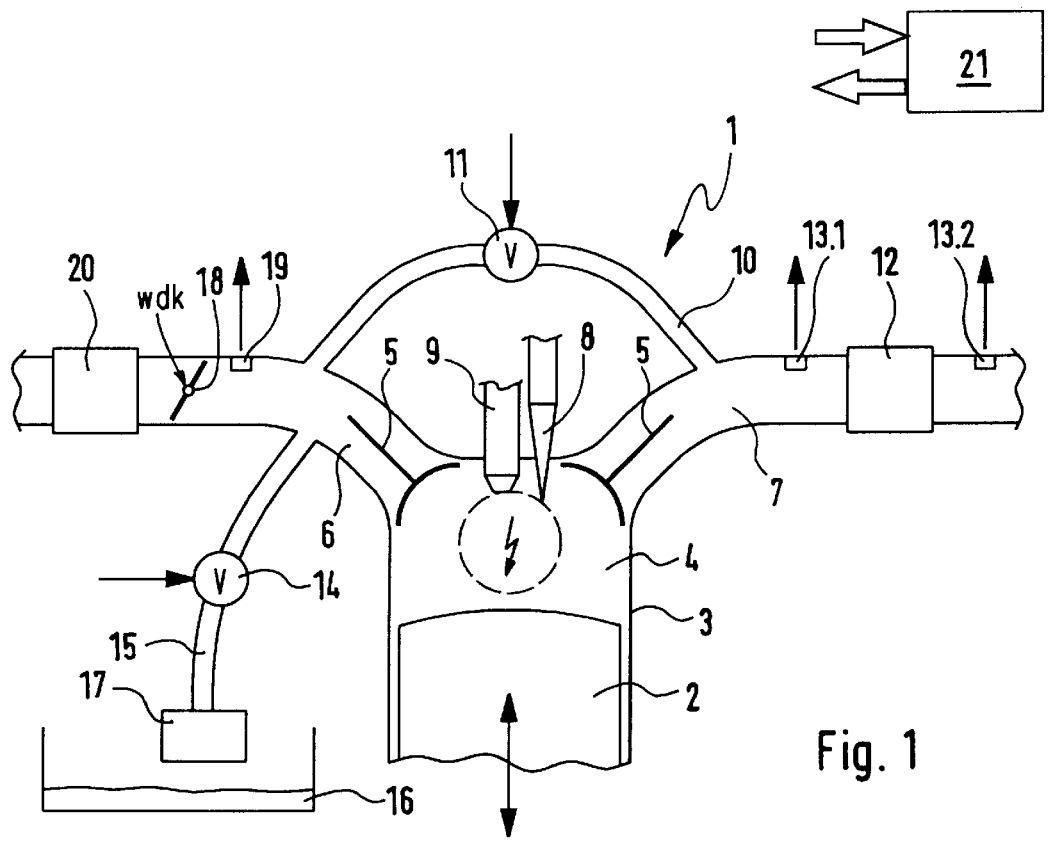
FIG. 1 shows a schematic diagram of an embodiment of a system according to the present invention for operating an internal combustion engine of a motor vehicle.

FIG. 1 shows an internal combustion engine 1, where a piston 2 can move back and forth in a cylinder 3. Cylinder 3 has a combustion chamber 4 which is connected by valves 5 to an intake manifold 6 and an exhaust pipe 7. In addition, an injection valve 8 and a spark plug 9 are also provided for combustion chamber 4. Exhaust pipe 7 is connected to intake manifold 6 by an exhaust gas recirculation line 10 and a controllable exhaust gas recirculation valve 11. In addition, a catalyst 12 (with an upstream lambda sensor 13.1 and a downstream lambda sensor 13.2) is connected to exhaust pipe 7. A tank vent line 15, which is provided with a controllable tank vent valve 14 and is connected to an activated carbon filter 17 which is supplied by a fuel container 16 leads to intake pipe 6. In addition, a controllable throttle valve 18, a pressure sensor 19 and an air flow sensor 20 are accommodated in intake manifold 6.

In a first mode of operation, homogeneous operation of combustion engine 1, fuel is injected into combustion chamber 4 by injection valve 8 during an intake phase produced by piston 2. Turbulence is created in the injected fuel by the simultaneous intake of air, and thus the fuel is essentially uniformly distributed in combustion chamber 4. Then the fuel-air mixture is compressed during the compression phase and next it is ignited by sparkplug 9. Piston 2 is driven by the expansion of the ignited fuel.

In a second mode, stratified operation of combustion engine 1, fuel is injected into combustion chamber 4 by injection valve 8 during a compression phase produced by piston 2 in such a way that the fuel is guided by a wall of combustion chamber 4 into the immediate vicinity of sparkplug 9. The injection takes place immediately before the top dead center of piston 2. Then, using sparkplug 9, the fuel is ignited, so that piston 2 is then driven by the expansion of the ignited fuel in the following operating phase.

In stratified operation and in homogeneous operation, the time of fuel injection into combustion chamber 4 through injection valve 8 is calculated by a controller 21 specifically with regard to low fuel consumption and/or low exhaust production. To this end, controller 21 has a microprocessor which has a program stored in a storage medium, specifically a read-only memory, which is suitable for performing the above-described control and/or regulation. Controller 21 receives input signals which are engine operating parameters measured by sensors. For example, controller 21 is connected to lambda sensor 13 and/or pressure sensor 19. Controller 21 generates output signals with which engine performance can be influenced according to the desired control and/or regulation by way of actuators. For example, controller 21 is connected to injection valve 8, sparkplug 9, exhaust gas recirculation valve 11, tank vent valve 14 and/or throttle valve 18.

The actual time of fuel injection into combustion chamber 4 through injection valve 8 is done in time increments. These increments are defined by the sequence of predetermined angle of rotation distances of a rotating shaft in combustion engine 1. The smaller the increment, i.e., the smaller the angle of rotation distances, the more accurately the actual injection time can approach the calculated injection time.

For example, a crankshaft linked to piston 2 may be provided with teeth or the like, so that each tooth triggers an electric signal by rotation in a respective sensor. With an equal spacing of the teeth, the signal represents the predetermined angle of rotation distances and thus the increment. For example, the increment may be an angle of rotation distance of six degrees.

The rpm nmot of internal combustion engine 1 can also be determined by controller 21 from the above-described electric signal by reference to the time.

Thus, fuel is actually always injected into combustion chamber 4 only at the times corresponding to this interval, i.e., every six degrees of crankshaft angle, for example.

By taking into account the rising and falling edges of the aforementioned electric signal, controller 21 can cut the increment in half with a corresponding computation effort. It is thus possible for the actual injection time to also occur at times between the previous increments, i.e., every three degrees of crankshaft angle. In this case, the increments correspond to an angle of rotation distance of three degrees.

By additional calculations by controller 21, it is possible to further reduce the angle of rotation distance. In particular, it is possible for the actual injection time to occur at one-degree increments with a corresponding computation effort by controller 21. In this case, the interval thus corresponds to an angle of rotation distance of one degree.

Figure 2:
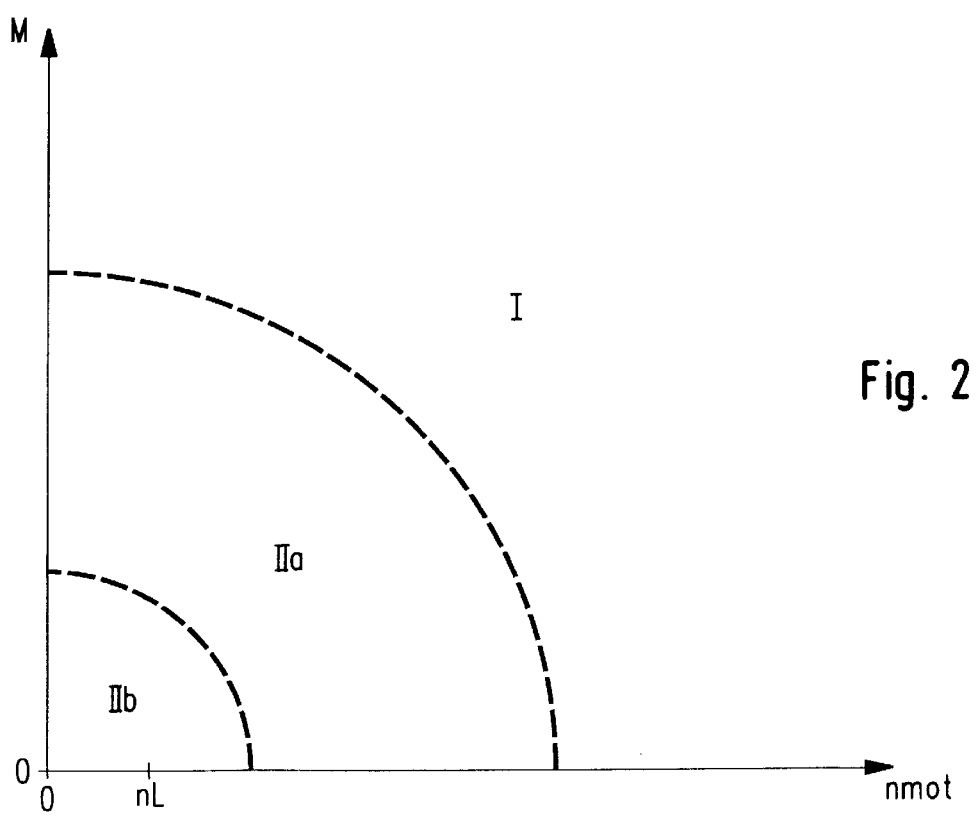
FIG. 2 shows a schematic coordinate system on whose axes an rpm of an internal combustion engine and a load applied to the engine are plotted.

As shown in FIG. 2, the coordinate system shown is formed by the rpm nmot of engine 1 and the load M applied to engine 1. Load M can also be obtained from the power required from engine 1 by the driver and other requirements of the vehicle.

The quadrant of the coordinate system shown has an area I, an area IIa and an area IIb.

Area I corresponds to high rpm nmot of engine 1 and high loads M applied to engine 1. In area I, engine 1 is operated in homogeneous operation, i.e., in the first mode. In addition, a larger angle of rotation distance, for example, six degrees, is defined as the interval in area I.

Area IIa corresponds to a medium rpm nmot of engine 1 and a medium load M applied to engine 1. In area IIa, combustion engine 1 is operated in stratified operation, i.e., in the second mode. In addition, a medium angle of rotation distance, e.g., three degrees, is defined as the interval in area IIa.

Area IIb corresponds to low rpm nmot of engine 1 and low loads M applied to engine 1. The idling speed nL of engine 1 is in area IIb. In area IIb, engine 1 is operated in stratified operation, i.e., in the second mode. In addition, a smaller angle of rotation distance, for example, one degree, is defined as the interval in area IIb.

A larger angle of rotation distance is defined in area I. This requires the least computation effort on the part of controller 21. This takes into account the fact that the higher rpm nmot of engine 1 is in area I. In homogeneous operation of area I, this larger angle of rotation distance and the associated lower accuracy in the time of actual injection are of only subordinate importance.

In areas IIa and IIb, smaller angle of rotation distances are defined. This makes it possible in stratified operation in areas IIa and IIb for the actual injection time to approach the calculated injection time with a greater accuracy than in area I. This is extremely important with regard to fuel savings in stratified operation The smaller angle of rotation distances in areas IIa and IIb require a greater computation effort for controller 21, as mentioned above. However, this is compensated or made possible by the fact that these smaller angle of rotation distances are defined only at medium and low rpm nmot of engine I. Because of the lower rpm nmot, controller 21 has time available for the greater computation required.

In area IIb, the accuracy of the injection time is further increased in comparison with area IIa. Because of the even smaller rpm nmot of engine 1, the resulting greater computation effort can be handled by controller 21.

On the whole, the angle of rotation distance corresponding to the interval in which fuel can actually be injected changes as a function of engine rpm nmot. At a smaller rpm nmot, the angle of rotation distance is also smaller and thus the accuracy of the actual injection time with regard to the calculated time is greater. Thus, the resolution of the interval becomes greater at lower rpm nmot.

What is claimed is:

1. A method for operating an internal combustion engine comprising the steps of:

providing predetermined intervals corresponding to predetermined angle of rotation distances of a shaft of the internal combustion engine; and at the predetermined intervals, injecting fuel directly into a combustion chamber of the internal combustion engine one of during an intake phase in a first mode and during a compression phase in a second mode, wherein the predetermined intervals correspond to first angle of rotation distances when the internal combustion engine operates at first revolutions-per-minute (rpm) and when a first load is applied to the internal combustion engine, wherein the predetermined intervals correspond to second angle of rotation distances when the internal combustion engine operates at second rpm and when a second load is applied to the internal combustion engine, and wherein the first angle of rotation distances are greater than the second angle of rotation distances, the first rpm are greater than the second rpm, and the first load is greater than the second load.

2. The method according to claim 1, wherein the predetermined intervals correspond to third angle of rotation distances when the internal combustion engine operates at third rpm and when a third load is applied to the internal combustion engine, and wherein the second angle of rotation distances are greater than the third angle of rotation distances, the second rpm are greater than the third rpm, and the second load is greater than the third load.

3. The method according to claim 1, wherein the first angle of rotation distances are approximately two times the second angle of rotation distances.

4. The method according to claim 2, wherein the second angle of rotation distances are approximately three times the third angle of rotation distances.

5. The method according to claim 1, wherein the internal combustion engine operates in the first mode when the internal combustion engine operates at the first rpm and when the first load is applied to the internal combustion engine, and wherein the internal combustion engine operates in the second mode when the internal combustion engine operates at the second rpm and the second load is applied to the internal combustion engine.

6. The method according to claim 1, wherein, in the second mode, the injected fuel is guided by one of a wall of the internal combustion chamber and a charge movement in the internal combustion chamber.

7. An electric storage medium for a controller of an internal combustion engine, comprising:

an arrangement storing a predetermined program executable on a computer, the predetermined program:

providing predetermined intervals corresponding to predetermined angle of rotation distances of a shaft of the internal combustion engine, and at the predetermined intervals, regulating the controller to inject fuel directly into a combustion chamber of the internal combustion engine one of during an intake phase in a first mode and during a compression phase in a second mode, wherein the predetermined intervals correspond to first angle of rotation distances when the internal combustion engine operates at first revolutions-per-minute (rpm) and when a first load is applied to the internal combustion engine, wherein the predetermined intervals correspond to second angle of rotation distances when the internal combustion engine operates at second rpm and when a second load is applied to the internal combustion engine, and wherein the first angle of rotation distances are greater than the second angle of rotation distances, the first rpm are greater than the second rpm, and the first load is greater than the second load.

8. The electric storage medium according to claim 7, wherein the electric storage medium is a read-only memory device.

9. The electric storage medium according to claim 7, wherein the computer includes a microprocessor.

* * * * *